(12) United States Patent
Kim et al.

(10) Patent No.: US 10,465,788 B2
(45) Date of Patent: Nov. 5, 2019

(54) TRANSMISSION MOUNT

(71) Applicants: Hyundai Motor Company, Seoul (KR); Kia Motors Corporation, Seoul (KR)

(72) Inventors: Yong Joo Kim, Gyeonggi-do (KR); Jong Hwan Jang, Seoul (KR); Kwanho Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 51 days.

(21) Appl. No.: 15/826,155

(22) Filed: Nov. 29, 2017

(65) Prior Publication Data

US 2019/0120365 A1 Apr. 25, 2019

(30) Foreign Application Priority Data

Oct. 23, 2017 (KR) .......................... 10-2017-0137024

(51) Int. Cl.
*F16M 13/00* (2006.01)
*F16H 57/028* (2012.01)
*F16H 57/025* (2012.01)

(52) U.S. Cl.
CPC ......... *F16H 57/028* (2013.01); *F16H 57/025* (2013.01)

(58) Field of Classification Search
CPC .. F16F 13/10; F16F 15/08; F16F 15/04; F16F 2224/025; F16F 1/36
USPC ............ 248/560, 632, 634, 638; 267/140.11, 267/140.13
See application file for complete search history.

(56) References Cited

U.S. PATENT DOCUMENTS

| | | | | |
|---|---|---|---|---|
| 6,390,223 | B1* | 5/2002 | Savage | B60K 5/1241 180/297 |
| 2006/0214340 | A1 | 9/2006 | Mikami et al. | |
| 2007/0000713 | A1* | 1/2007 | Mir | B60K 5/1208 180/300 |

(Continued)

FOREIGN PATENT DOCUMENTS

| | | |
|---|---|---|
| JP | H07280035 A | 10/1995 |
| JP | 2005249062 A | 9/2005 |

(Continued)

*Primary Examiner* — Steven M Marsh
(74) *Attorney, Agent, or Firm* — Mintz Levin Cohn Ferris Glovsky and Popeo, P.C.; Peter F. Corless (57) ABSTRACT

A transmission mount is provided that has a stopper which is separately assembled from an insulator to obtain an improved attenuation effect. The transmission mount includes a transmission mount bracket and an insulator that has a body press-fitted into the transmission mount bracket and a center core disposed therein. The insulator includes a base supported on a bottom surface of the transmission mount bracket and a connector that connects the body and the base. A stopper is provided that includes a vertical movement restrictor configured to come into contact with a lower portion of the body and an upper portion of the base to restrict a vertical movement of a center core and a lateral movement restrictor configured to come into contact with sides of the base to be latched with the sides of the base to restrict a lateral movement of the center core.

17 Claims, 8 Drawing Sheets

(56) References Cited

U.S. PATENT DOCUMENTS

| | | | |
|---|---|---|---|
| 2011/0266412 A1* | 11/2011 | Suzuki | B60K 5/12 |
| | | | 248/638 |
| 2014/0246558 A1* | 9/2014 | Ichikawa | F16F 13/1409 |
| | | | 248/634 |
| 2015/0028182 A1* | 1/2015 | Kim | B60K 5/12 |
| | | | 248/638 |
| 2015/0219175 A1 | 8/2015 | Eguchi | |
| 2017/0299007 A1* | 10/2017 | Scharf | F16F 1/3849 |
| 2018/0209298 A1* | 7/2018 | Binsberger | F01D 25/04 |

FOREIGN PATENT DOCUMENTS

| | | |
|---|---|---|
| JP | 2016142328 A | 8/2016 |
| KR | 10-1362461 B1 | 2/2014 |
| KR | 2014-0050850 A | 4/2014 |

\* cited by examiner

TRANSMISSION MOUNT

CROSS-REFERENCE TO RELATED APPLICATION

This application claims the benefit of Korean Patent Application No. 10-2017-0137024, filed on Oct. 23, 2017, the disclosure of which is incorporated herein by reference.

BACKGROUND

1. Field of the Disclosure

The present disclosure relates to a transmission mount, and more particularly, to a transmission mount having a stopper which allows movement of a center core to be restricted in vertical and lateral directions.

2. Description of the Related Art

In general, a transmission mount, which is provided to mount and support a power train including an engine and a transmission in a vehicle, supports a load of the power train, adjusts displacement, and prevents vibration and noise of a power train from being transferred to a vehicle body. The transmission mount may include a transmission mount bracket configured to support the power train and connected to the vehicle body, an insulator press-fitted into the transmission mount bracket, and a center core disposed at the center of the insulator. The power train is mounted on the center core and thus, the center core is capable of supporting the power train mounted in the vehicle.

To effectively reduce vibration and noise of the power train transferred to the vehicle body, the transmission mount is required to have great attenuation at a low speed and a low dynamic spring constant at a high speed. Accordingly, for the above-mentioned characteristics to be satisfactory, a hydro engine mount (fluid-enclosed engine mount) configured to enclose a predetermined amount of hydro liquid has been developed.

The hydro engine mount has a structure in which a predetermined amount of hydro liquid is enclosed therein to attenuate vibration as the hydro liquid flows, and is capable of simultaneously attenuating vibrations in a high-frequency region and a low-frequency region, and thus, the attenuation effect of the hydro engine mount is improved. However, as compared with a conventional transmission mount using a rubber insulator, the cost and weight of the hydro engine mount are increased substantially and the structure is complex. In addition, to improve the steering performance, there is a need to restrict the movement of the center core in a lateral direction as well as a vertical direction.

SUMMARY

Therefore, it is an aspect of the present disclosure to provide a transmission mount capable of obtaining an improved attenuation effect by dualizing a material for a stopper which is separately assembled. In addition, it is another aspect of the present disclosure to provide a transmission mount capable of restricting vertical and lateral movements of a center core. Additional aspects of the disclosure will be set forth in part in the description which follows and, in part, will be obvious from the description, or may be learned by practice of the disclosure.

In accordance with one aspect of the present disclosure, a transmission mount may include a transmission mount bracket; an insulator having a body press-fitted into the transmission mount bracket and a center core disposed therein, a base supported on a bottom surface of the transmission mount bracket, and a connector configured to connect the body and the base; and a stopper having a vertical movement restrictor configured to come into contact with a lower portion of the body and an upper portion of the base to restrict a vertical movement of the center core and a lateral movement restrictor configured to come into contact with left and right sides of the base and latched with the left and right sides of the base to restrict a lateral movement of the center core.

The stopper may be formed of a rubber material which is the same as a material for the insulator. Alternately, the stopper may be formed of a polyurethane material which is different from a material for the insulator. The vertical movement restrictor may include a protrusion disposed at an upper portion of the stopper and configured to protrude upward to come into contact with the lower portion of the body, and a supporter configured to come into contact with an upper portion of the base to be supported by the base. The connector may include an aperture through which the protrusion passes, wherein the protrusion may come into contact with the lower portion of the body.

The stopper may be prevented from being moved in a lateral direction by the protrusion inserted into the aperture. The body may include a boss configured to protrude downward from a central portion of the lower portion of the body and elongated in the lateral direction to correspond to a shape of the center core disposed inside the body, and the stopper may include a fixing groove recessed downward from a central portion of an upper portion of the protrusion to allow the stopper to be fixed to the boss. The stopper may include a depression recessed upward from a lower end of the supporter. A stiffness of the stopper may be adjusted by adjusting a depth of the depression.

The lateral movement restrictor may include a first stopper disposed on a left end of the supporter; and a second stopper disposed on a right end of the supporter. The base may include a latch sill latched with the first stopper; and a latch latched with the second stopper. The stopper may include a body disposed between the protrusion and the supporter; and an extension that extends rightward from right ends of the supporter and the body.

Additionally, the connector may include a pair of connectors configured to connect the body and the base, and the extension may extend to pass through a space between the pair of extensions. The first stopper may be latched with the latch sill to prevent the center core from moving when the stopper receives a load in a direction from a right side to a left side of the stopper. The second stopper may be latched with the latch to prevent the center core from moving when the stopper receives a load in a direction from a left side to a right side of the stopper.

In accordance with another aspect of the present disclosure, a transmission mount may include a transmission mount bracket; an insulator having a body press-fitted into the transmission mount bracket and a center core disposed therein, and a base supported on a bottom surface of the transmission mount bracket; and a stopper disposed between the body and the base to restrict vertical and lateral movements of the center core, wherein the stopper may include a protrusion disposed at an upper portion of the stopper and configured to protrude upward to come into contact with a lower portion of the body; a supporter configured to come into contact with an upper portion of the base to be supported by the base; a first stopper disposed on a left end of the supporter and latched with the base to prevent the center core from moving when the stopper receives a load in a direction from a right side to a left side of the stopper; and a second stopper disposed on a right end of the supporter and latched with the base to prevent the center core from moving when the stopper receives a load in a direction from a left side to a right side of the stopper.

The stopper may be formed of a rubber material which is the same as a material for the insulator, or a polyurethane material which is different from the material for the insulator. The base may include a latch sill latched with the first stopper and a latch latched with the second stopper.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The exemplary embodiments described herein and configurations illustrated in the accompanying drawings are merely examples of the present disclosure, and various modifications may be made at the time of filing of the present application to replace the exemplary embodiments and drawings of the present specification. In addition, throughout the accompanying drawings of the present specification, the same reference numerals or symbols are used to designate parts or elements performing substantially the same function.

Terms used herein are intended to describe exemplary embodiments only, and shall by no means restrict and/or limit the present disclosure. Unless clearly used otherwise, expressions in a singular form include a meaning of a plural form. In addition, although any terms including ordinal numbers such as "first" or "second" may be used herein to describe various elements, the elements should not be limited by the terms. The terms are only used to distinguish one element from another. For example, a first element could be termed a second element, and, similarly, a second element could be termed a first element, without departing from the scope of the present disclosure. The term "and/or" includes any combination of a plurality of disclosed items related thereto, or one of a plurality of disclosed items related thereto. Meanwhile, the terms such as "front," "rear," "upper," or "lower" used in the following description are defined based on the accompanying drawings, and the shape and position of each element are not limited by these terms.

Hereinafter, embodiments in accordance with the present disclosure will be described in detail with reference to the accompanying drawings. In the following description, upper and lower directions will be defined based on FIGS. 1 and 4, with an upper portion of FIGS. 1 and 4 being referred to as an upper direction and a lower portion of FIGS. 1 and 4 being referred to as a lower direction. In addition, a left direction refers to an extension direction of a center core that extends outward from a transmission mount bracket, and a right direction refers to a direction opposite to the left direction.

Figure 1:
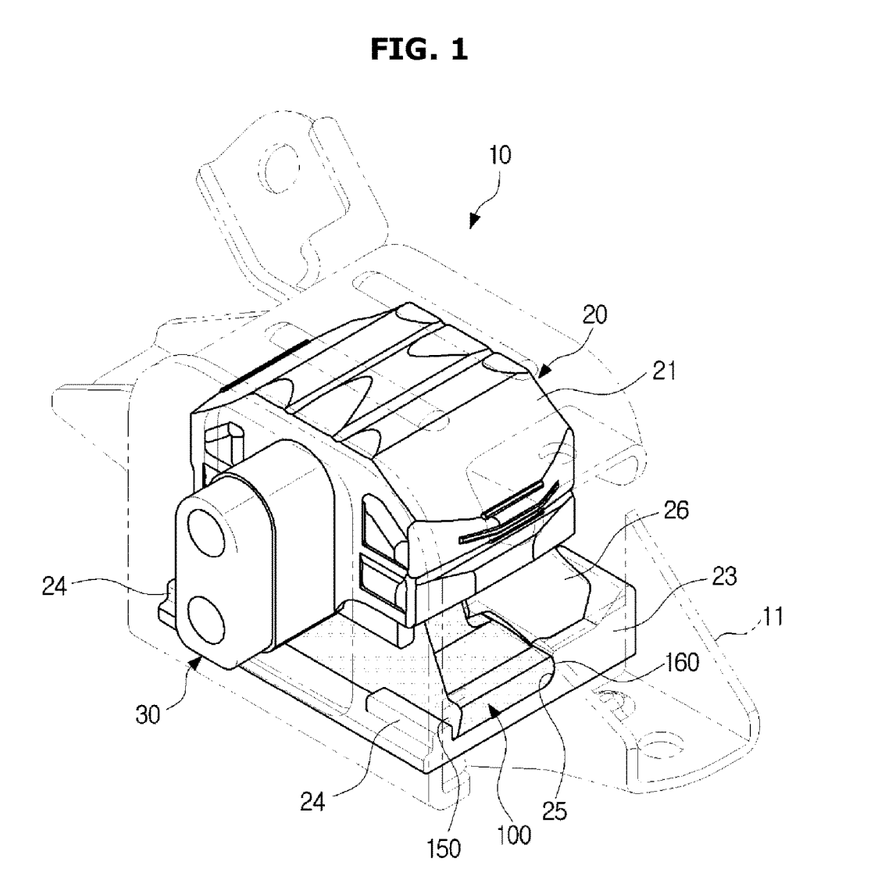
FIG. 1 is a perspective view of a transmission mount in accordance with one exemplary embodiment of the present disclosure.
Figure 2:
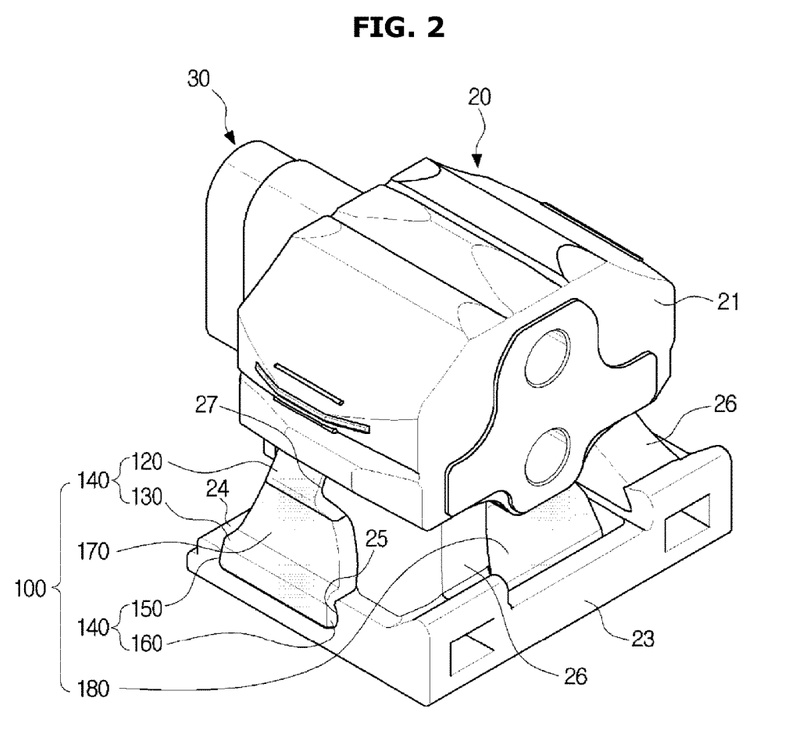
FIG. 2 is a perspective view of the transmission mount shown in FIG. 1 from another direction in accordance with one exemplary embodiment of the present disclosure.

FIG. 1 is a perspective view of a transmission mount in accordance with one exemplary embodiment of the present disclosure and FIG. 2 is a perspective view of the transmission mount shown in FIG. 1 from another direction. Referring to FIGS. 1 and 2, the transmission mount may include a transmission mount bracket 10 in a box type, an insulator 20 press-fitted into the transmission mount bracket 10, a center core 30 disposed inside the insulator 20, and a stopper 100 configured to restrict the vertical and lateral movements of the center core 30.

The transmission mount bracket 10 may include a plurality of brackets 11 coupled to a vehicle body (not shown). The insulator 20 press-fitted into the transmission mount bracket 10 may be made of a rubber material and may be vertically or laterally movable in the transmission mount bracket 10 together with the center core 30 disposed in the insulator 20. The insulator 20 may include a body 21 in which the center core 30 is disposed, a base 23 supported by a bottom surface of the transmission mount bracket 10, and a connector 26 configured to connect to the body 21 and the base 23 to each other.

In particular, the center core 30 may be disposed in the body 21, and the body 21 may allow a first side thereof to extend to an outside of the transmission mount bracket 10. The body 21 may include a boss 22 which protrudes downward from a lower central portion of the body and is elongated laterally. A fixing groove 121 disposed on the protrusion 120 of the stopper 100 to be described below may be fixed to the boss 22, and the stopper 100 may be prevented from moving in front-rear direction while the fixing grooved is fixed to the boss 22. The details will be described below.

The base 23 may come into contact with the bottom surface of the transmission mount bracket 10 and thus, the base 23 may be supported by the bottom surface. The base 23 may include a latch sill 24 disposed on a left end of the base 23 and latched with a first stopper 150 of the stopper 100 to be described below, and a latch 25 latched with a second stopper 160 of the stopper to be described below. The connector 26 may include a pair of connecters configured to connect the body 21 and the base 23 to each other. The connector 26 may include an aperture 27 through which a part of the protrusion 120 of the stopper 100, which will be described below, passes to come into contact with a lower portion of the body 21. In other words, the protrusion 120 of the stopper 100 may be inserted into the aperture 27 of the connector 26.

The center core 30 may have a first side disposed in the body 21 of the insulator 20 and a second side that extends to an outside of the body 21. The second side of the center core 30 that extends to the outside of the body 21 may extend to an outside of the transmission mount bracket 10. A power train (not shown) may be mounted on the second side of the center core 30, which extends to the outside of the body 21, such that the power train is coupled to the vehicle body. The center core 30 on which the power train is mounted may be configured to move in the vertical or lateral direction (e.g., vertically or horizontally) and the configuration of the stopper 100 configured to restrict the movement of the center core 30 in the vertical or lateral direction will be described below.

Figure 3:
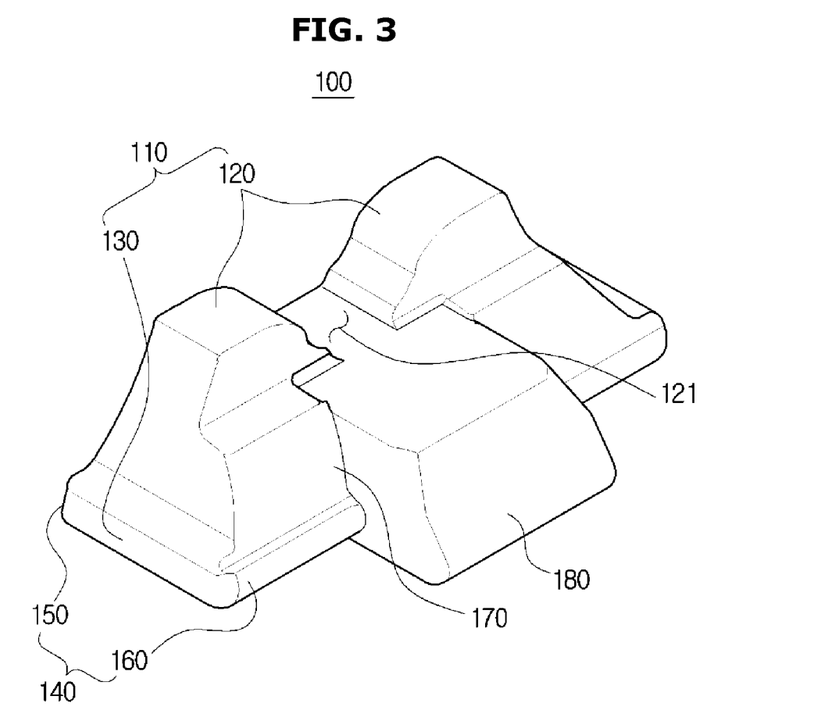
FIG. 3 is a view illustrating a stopper in accordance with one exemplary embodiment of the present disclosure.
Figure 4:
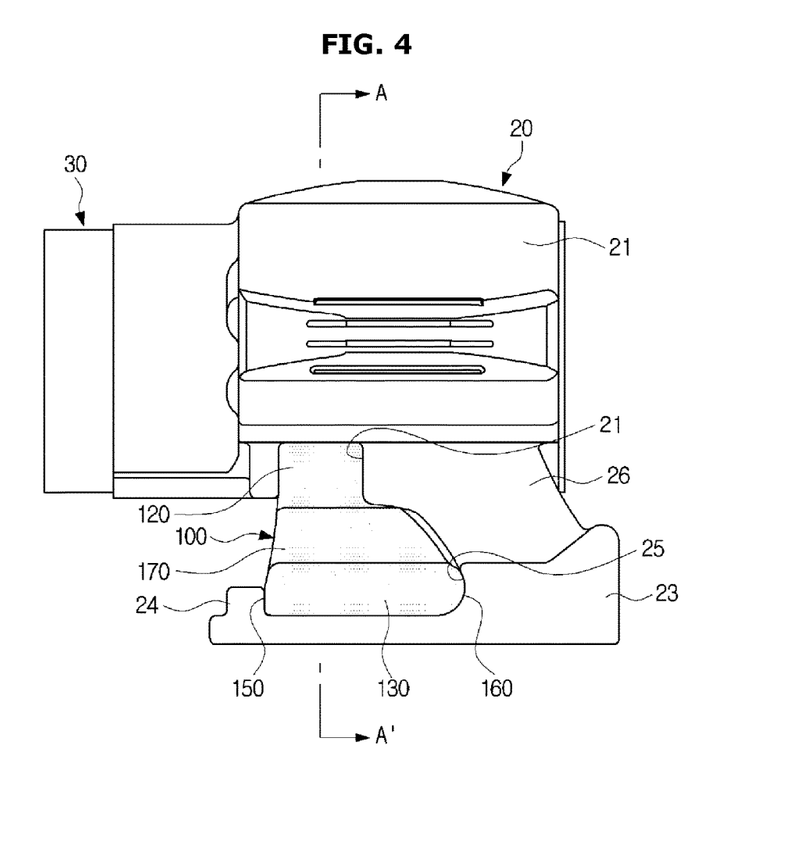
FIG. 4 is a front view illustrating a state in which a stopper is assembled with an insulator in accordance with one exemplary embodiment of the present disclosure.
Figure 5:
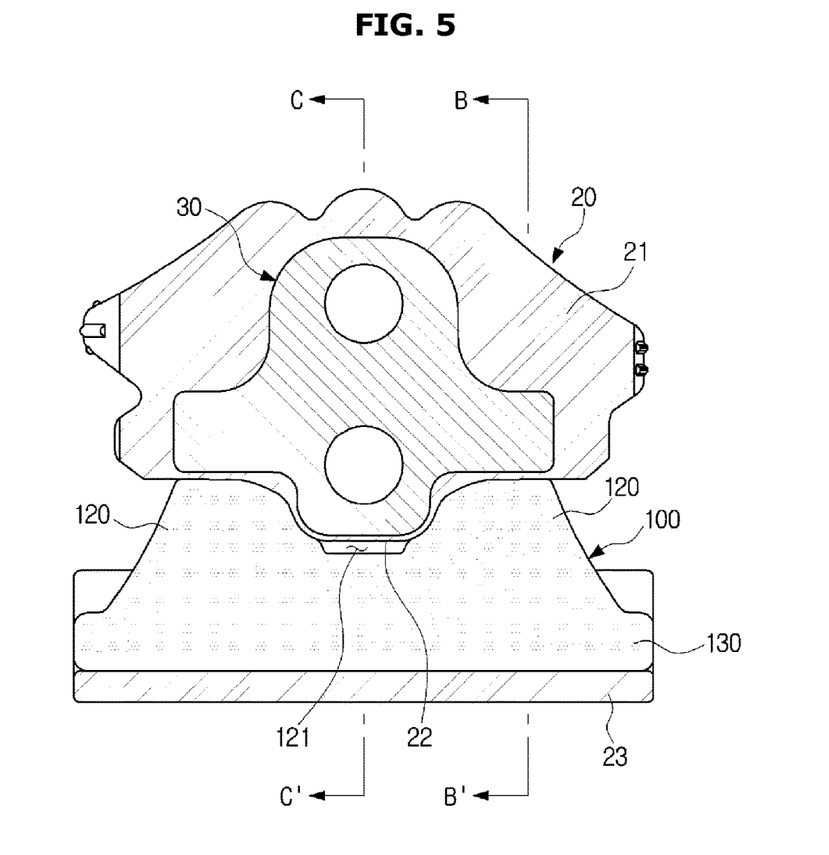
FIG. 5 is a sectional view taken along line A-A of FIG. 4 in accordance with one exemplary embodiment of the present disclosure.
Figure 6:
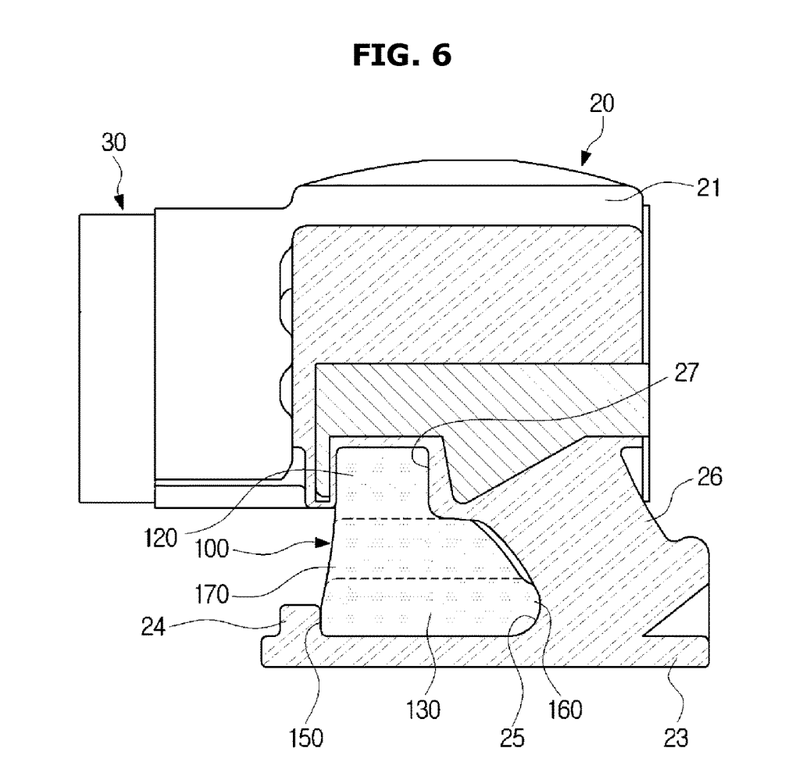
FIG. 6 is a sectional view taken along line B-B' of FIG. 5 in accordance with one exemplary embodiment of the present disclosure.
Figure 7:
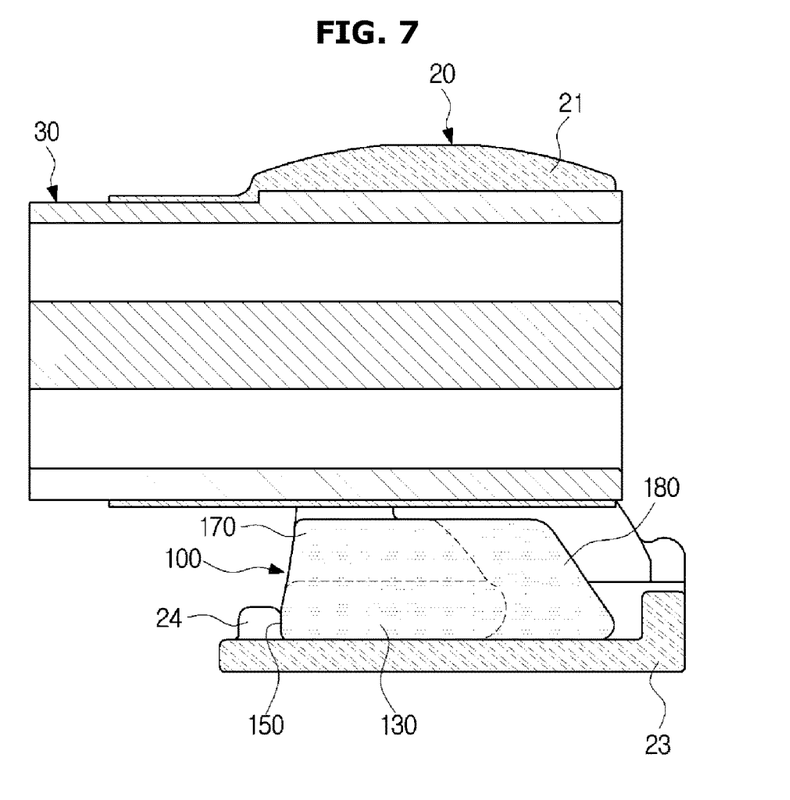
FIG. 7 is a sectional view taken along line C-C' of FIG. 5 in accordance with one exemplary embodiment of the present disclosure.

FIG. 3 is a view illustrating a stopper in accordance with one exemplary embodiment of the present disclosure. FIG. 4 is a front view illustrating a state in which the stopper is assembled with an insulator in accordance with one exemplary embodiment of the present disclosure. FIG. 5 is a sectional view taken along line A-A' of FIG. 4. FIG. 6 is a sectional view taken along line B-B' of FIG. 5. FIG. 7 is a sectional view taken along line C-C' of FIG. 5.

As shown in FIGS. 3 to 7, the stopper 100 may be assembled with the insulator 20 such that upper and lower surfaces of the stopper 100 come into contact with a lower portion of the body 21 of the insulator 20 and an upper portion of the base, respectively. The stopper may be formed of a rubber material which is the same material as the insulator 20 or may be formed of a polyurethane material which is different from the material for the insulator 20. Since the stopper 100 may be manufactured and assembled separately from the insulator 20, the material for the stopper 100 may be dualized with a rubber material and a polyurethane material which may be selectively applied suitably for required specifications.

When the stopper 100 is formed of a polyurethane material, it may be possible to secure ride comfort by an improved attenuation effect, minimize the increase in cost and weight, and simplify the structure. Thus, the stopper 100 formed of a polyurethane material may be applied to a sports vehicle requiring an improved attenuation force. In addition, a rubber stopper 100 having low rigidity may be applied to a high-grade sedan vehicle for which improved attenuation force is not necessary and insulation performance is more important.

Furthermore, the stopper 100 may include a vertical movement restrictor 110 configured to restrict the vertical movement of the center core 30 and a lateral movement restrictor 140 configured to restrict the lateral movement of the center core 30. The vertical movement restrictor 110 configured to restrict the vertical movement of the center core 30 may include a protrusion 120 that protrudes upward from an upper portion of the stopper 100 to come into contact with a lower portion of the body 21 of the insulator 20, and a supporter 130 configured to come into contact with an upper portion of the base 23 and supported by the base 23.

Since the protrusion 120 and the supporter 130 of the stopper 100 come into contact with the lower portion of the body 21 of the insulator 20 and the upper portion of the base 23, respectively, the vertical movement of the center core 30 due to vibration may be restricted. The protrusion 120 disposed on the upper portion of the stopper 100 may pass through the connector 26 of the insulator 20 to come into contact with the lower portion of the body 21. Since the protrusion 120 may be inserted into the aperture 27, lateral movement of the stopper 100 may be prevented when the stopper 100 is assembled with the insulator 20. The protrusion 120 may include the fixing groove 121 elongated on the central portion of the upper portion of the protrusion 120 in the lateral direction and recessed downward.

Additionally, the boss 22 may be elongated in the lateral direction on the lower portion of the body 21 of the insulator 20 corresponding to the fixing groove 121 and may protrude downward. When the stopper 100 is assembled with the insulator 20, since the fixing groove 121 of the stopper 100 may be fixed to the boss 22 of the insulator 20, the stopper 100 may be assembled with the insulator 20 and thus, the stopper 100 may be prevented from moving in a front-rear direction. The lateral movement restrictor 140 configured to restrict the lateral movement of the center core 30 may include the first stopper 150 disposed on a leftmost end of the supporter 130 and the second stopper 160 disposed on a rightmost end of the supporter 130.

The first stopper 150 disposed on the leftmost end of the supporter 130 may come into contact with the latch sill 24 disposed on the left end of the base 23, and the second stopper 160 disposed on the rightmost end of the supporter 130 may come into contact with the latch 25 disposed at the right side of the latch sill 24 to be spaced apart from the latch sill 24. Since the first stopper 150 may be latched with the latch sill 24 of the base 23, when the stopper 100 receives a load in a direction from the right side to the left side of the stopper 100, the first stopper 150 may be latched with the latch sill 24 and thus, the center core 30 may be prevented from moving in the direction from the right side to the left side.

In addition, since the second stopper 160 may be latched with the latch 25 of the base 23, when the stopper 100 receives a load in a direction from the left side to the right side of the stopper 100, the second stopper 160 may be latched with the latch 25 and thus, the center core 30 may be prevented from moving in the direction from the left side to the right side. The stopper 100 may include a body 170 disposed between the protrusion 120 and the supporter 130 and an extension 180 that extends rightward from right ends of the supporter 130 and the body 170.

Particularly, the extension 180 may be disposed on the central portions of the supporter 130 and the body 170 to have a width less than each of the widths of the supporter 130 and the body 170 in the front-rear direction, and may extend to pass through a space between a pair of connectors 26 of the insulator 20. Since the extension 18 is elongated to pass through the space between the connectors 26 of the insulator 20, the stopper 100 may be configured to restrict the vertical movement of the center core 30 in a greater range in the lateral direction.

Figure 8:
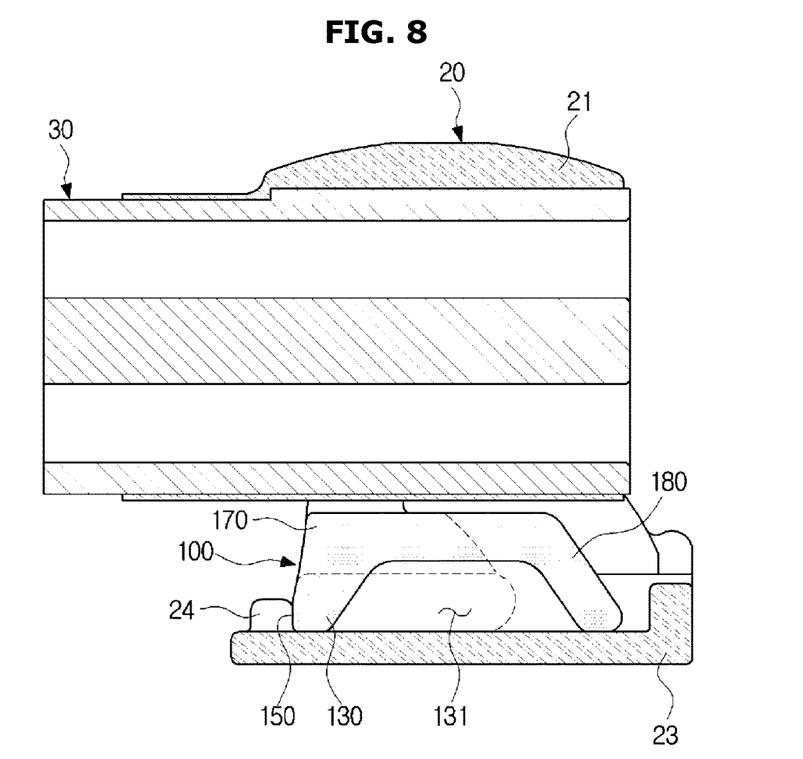
FIG. 8 is a view illustrating a depression formed in a supporter of a stopper in accordance with one exemplary embodiment of the present disclosure.

FIG. 8 is a view illustrating a state in which a depression is formed in a supporter of a stopper in accordance with one exemplary embodiment of the present disclosure. As shown in FIG. 8, a depression 131 may be recessed upward on the lower end of the supporter 130 of the stopper 100. The rubber stopper 100 having low rigidity may be applied to a high-grade sedan vehicle for which improved attenuation force is not necessary and insulation performance is more important, and the rigidity of the stopper 100 may be adjustable by adjusting the depth of the depression 131 provided in the supporter 130.

As is apparent from the above description, according to the exemplary embodiments of the present disclosure, a material for a stopper which is separately assembled may be dualized so that, when a polyurethane material is applied, it may be possible to provide improved ride comfort by a high attenuation effect, to minimize the increase in cost and weight, and to simplify the structure. Further, rubber stoppers may be used in applications where high attenuation force is not required or insulation performance is more important. Furthermore, steering performance may be improved by restricting movement of a center core in vertical and lateral directions.

While the specific shape and directions have been mainly described with reference to the accompanying drawings for the purpose of explaining the transmission mount, the exemplary embodiments may be changed and modified by those skilled in the art, and it should be interpreted that such changes and modifications fall within the scope of the present disclosure.

What is claimed is:

1. A transmission mount, comprising:
    a transmission mount bracket;
    an insulator having a body press-fitted into the transmission mount bracket and a center core disposed therein, a base supported on a bottom surface of the transmission mount bracket, and a connector configured to connect the body and the base; and
    a stopper including a vertical movement restrictor configured to come into contact with a lower portion of the body and an upper portion of the base to restrict a vertical movement of the center core and a lateral movement restrictor configured to come into contact with left and right sides of the base and latched with the left and right sides of the base to restrict a lateral movement of the center core,
    wherein the vertical movement restrictor includes a protrusion disposed at an upper portion of the stopper and configured to protrude upward to come into contact with the lower portion of the body; and a supporter configured to come into contact with an upper portion of the base to be supported by the base.

2. The transmission mount according to claim 1, wherein the stopper is formed of a same rubber material as a material for the insulator.

3. The transmission mount according to claim 1, wherein the stopper is formed of a polyurethane material different from a material for the insulator.

4. The transmission mount according to claim 1, wherein the connector includes an aperture through which the protrusion passes, wherein the protrusion comes into contact with the lower portion of the body.

5. The transmission mount according to claim 4, wherein the stopper is prevented from being moved in a lateral direction by the protrusion inserted into the aperture.

6. The transmission mount according to claim 5, wherein:
    the body includes a boss configured to protrude downward from a central portion of the lower portion of the body and elongated in the lateral direction to correspond to a shape of the center core disposed inside the body; and
    the stopper includes a fixing groove recessed downward from a central portion of an upper portion of the protrusion to allow the stopper to be fixed to the boss.

7. The transmission mount according to claim 4, wherein the stopper includes a depression recessed upward from a lower end of the supporter.

8. The transmission mount according to claim 7, wherein a stiffness of the stopper is adjusted by adjusting a depth of the depression.

9. The transmission mount according to claim 1, wherein the lateral movement restrictor includes:
    a first stopper disposed on a left end of the supporter; and
    a second stopper disposed on a right end of the supporter.

10. The transmission mount according to claim 9, wherein the base includes:
    a latch sill latched with the first stopper; and
    a latch latched with the second stopper.

11. The transmission mount according to claim 10, wherein the stopper includes:
    a body disposed between the protrusion and the supporter; and
    an extension that extends rightward from right ends of the supporter and the body.

12. The transmission mount according to claim 11, wherein:
    the connector includes a pair of connectors configured to connect the body and the base; and
    the extension extends to pass through a space between the pair of extensions.

13. The transmission mount according to claim 12, wherein the first stopper is latched with the latch sill to prevent the center core from moving when the stopper receives a load in a direction from a right side to a left side of the stopper.

14. The transmission mount according to claim 12, wherein the second stopper is latched with the latch to prevent the center core from moving when the stopper receives a load in a direction from a left side to a right side of the stopper.

15. A transmission mount, comprising:
    a transmission mount bracket;
    an insulator having a body press-fitted into the transmission mount bracket and a center core disposed therein, and a base supported on a bottom surface of the transmission mount bracket; and
    a stopper disposed between the body and the base to restrict vertical and lateral movements of the center core,
    wherein the stopper includes:
        a protrusion disposed at an upper portion of the stopper and configured to protrude upward to come into contact with a lower portion of the body;
        a supporter configured to come into contact with an upper portion of the base to be supported by the base;

a first stopper disposed on a left end of the supporter and latched with the base to prevent the center core from moving when the stopper receives a load in a direction from a right side to a left side of the stopper; and a second stopper disposed on a right end of the supporter and latched with the base to prevent the center core from moving when the stopper receives a load in a direction from a left side to a right side of the stopper.

16. The transmission mount according to claim 15, wherein the stopper is formed of a same rubber material as a material for the insulator, or a polyurethane material different from the material for the insulator.

17. The transmission mount according to claim 15, wherein the base includes:

a latch sill latched with the first stopper; and a latch latched with the second stopper.

* * * * *